March 5, 1963   J. D. DESCHAMPS ET AL   3,080,546
INDICATOR DEVICE FOR VERTICAL LANDINGS
Filed May 29, 1961
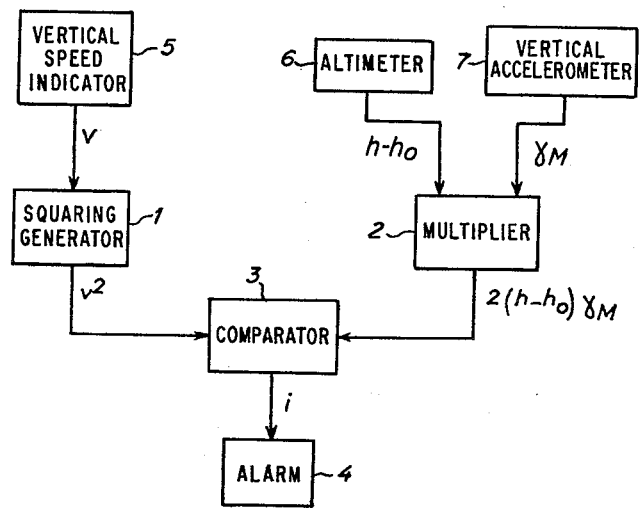
INVENTORS
Jacques D. Deschamps
Jean P. Vesigot
Watson, Cole, Grindle + Watson
ATTORNEYS

United States Patent Office 3,080,546
Patented Mar. 5, 1963

3,080,546
INDICATOR DEVICE FOR VERTICAL LANDINGS
Jacques Désiré Deschamps, Saint-Cloud, and Jean-Paul Vesigot, Paris, France, assignors to Société Nationale d'Etude et de Construction de Moteurs d'Aviation, Paris, France, a company of France
Filed May 29, 1961, Ser. No. 113,499
Claims priority, application France Feb. 7, 1961
4 Claims. (Cl. 340—27)

One system has been discovered in which an indicator device facilitates the pilot's task during the particularly difficult phase of approaching the ground in the case of a vertical-landing aircraft. This system indicates whether the pilot has himself to carry out the operation or whether he has to check the correct evolution in the case of an automatic landing and, when so required, to take over the controls if the automatic pilot proves defective.

In accordance with the above mentioned system, the pilot has at his disposal a series of indicators which supply directly at every instant the information useful for carrying out or controlling a landing in the desired conditions of safety and economy. This series of indicators comprises a certain number of instruments, and in particular:

(a) An indicator of the maximum acceleration obtainable by causing the propulsion group of the aircraft to operate at full power. This value of acceleration being called $\gamma_M$;

(b) An indicator of the acceleration which, if it were impressed on the aircraft and thereafter remained constant, would enable zero speed to be reached at a safety altitude $h_0$ of the order of a few metres, this values of acceleration being designated $\gamma_1$.

The value $\gamma_M$ is expressed by the following formula:

$$\gamma_M = \frac{P}{m} - g$$

in which P is the maximum thrust which can be developed by the propulsion group of the aircraft, m is the total weight of the aircraft and g is the acceleration due to gravity. The value $\gamma_M$ is measured for example by an accelerometer with a substantially vertical shaft which gives the acceleration $g'$ of apparent gravity existing on board the aircraft after the pilot has regulated the propulsion unit to maximum thrust. The relation $$g' = \frac{P}{m}$$

then enables $\gamma_M$ to be determined by applying the equation: $\gamma_M = g' - g$, without it being necessary to know P and m separately.

The other value of acceleration $\gamma_1$ is expressed by the following formula:

$$\gamma_1 = \frac{v^2}{2(h-h_0)}$$

in which v is the vertical speed of the aircraft measured by a variometer, h is the altitude measured by an altimeter and $h_0$ is a safety altitude of the order of a few metres.

The system referred to also employs an analogue calculator which builds up the value of $\gamma_1$.

It is absolutely imperative that $\gamma_1$ should always remain smaller than $\gamma_M$. In fact, if $\gamma_1$ were to exceed $\gamma_M$, this would mean that in order to reach the ground with zero speed, it would be necessary to apply an acceleration greater than the maximum acceleration. As this is impossible by definition, the aircraft will inevitably hit the ground with an appreciable vertical speed.

In addition, during the phase of descent of the aircraft, it is necessary to prevent the vertical speed of descent exceeding certain limit of safety—designated by $V_M$— beyond which the operation of the propulsion group becomes defective; in particular, the maximum thrust which it can then supply diminishes substantially and this is obviously also the case for the value $\gamma_M$.

If this limit $V_M$ is accidentally exceeded, the landing may still be carried out correctly, to the extent that the condition that $\gamma_1$ is less than $\gamma_M$ is still fulfilled, taking account of the fact that the maximum thrust which the propulsion group can supply has diminished.

The present invention has for its object to warn the pilot of the aircraft which is carrying out the vertical landing operation, if and when the imperative condition referred to above is no longer fulfilled, meaning that a crash is unavoidable.

The device in accordance with the invention is designed to carry out the comparison of signals obtained from adequate measuring or calculating instruments and to actuate a suitable alarm system—for example by the illumination of a light signal—as soon as the value of $\gamma_1$ becomes greater than that of $\gamma_M$. It comprises essentially a circuit which receives and/or builds up the desired signals and applies them to a comparator which effects the control of the alarm device.

The description which follows below with regard to the accompanying drawings (which are given by way of example only and not in any limitative sense) will make it quite clear how the invention may be carried into effect in the text or in the drawings being understood to form a part of the said invention.

The single FIGURE is a block diagram of a device according to the present invention.

In this device, a signal proportional to the vertical speed v of the aircraft and derived from a variometer 5 (or vertical speed measuring instrument) is applied to a squaring generator 1 or parabolic diode translator supplying a signal proportional to $v^2$. Furthermore, a signal h derived from an altimeter 6 and a signal $\gamma_M$ obtained from a vertical accelerometer 7 are applied to a diode multiplier stage 2 designed so as to deliver a signal proportional to $2(h-h_0)\gamma_M$.

These two signals $v^2$ and $2(h-h_0)\gamma_M$ delivered from the stages 1 and 2 are applied to a comparator 3 arranged in such manner as to generate a current $i$ which operates an alarm device 4 only if and when the following relation is satisfied:

$$v^2 > 2(h-h_0)\gamma_M$$

with a certain margin of safety dependent on the accuracy of the measuring instruments which give $v$, $h-h_0$ and $\gamma_M$.

The attention of the pilot is thus attracted and it only remains for him to proceed to carry out emergency operations.

It will of course be understood that modifications may be made to the form of embodiment which has just been described, in particular by the substitution of equivalent technical means, without thereby departing from the scope of the present invention.

Thus, in particular, it is quite clear that the same result could be obtained with a different method of building up the signals, for example by applying to the comparator 3 the signals $v^2/2(h-h_0)$ and $\gamma_M$ or alternatively, by directly applying the signals $\gamma_1$ and $\gamma_M$ as prepared by analogue calculators.

The squaring generator 1, the multiplier 2, and the comparator 3 may be of any convenient form of circuitry well known in the art. For example, the squaring generator 1 might be of the type shown in FIG. 6.3(c) on page 253 of the book, entitled "Electronic Analog Computers," by Korn and Korn, 2nd edition, 1956, McGraw-Hill Book Company. In this figure, the input signals indicated as X1 and X2 would each be the same signal V from applicants' vertical speed indicator 5. The multiplier 2 might be of the same type as shown in this figure of the text referred to above in which case the grids would be separately connected to the outputs of the altimeter 6 and the vertical accelerometer 7. The comparator 3 might be of the type shown in FIG. 6.27(a) on page 298 of the above mentioned text.

What is claimed is:

1. In a vertical landing aircraft equipped with instruments measuring its altitude $(h-h_0)$ above a predetermined low altitude, its vertical velocity of descent $(v)$ and its maximum possible vertical acceleration $(\gamma_M)$, a safety warning device comprising means for building up signals proportional to $v^2$, $(h-h_0)$ and $\gamma_M$, a comparator responsive to the relation $v^2 > 2(h-h_0)\gamma_M$ and adapted to generate an output signal if and when this relation is met, and an alarm system connected with the output of said comparator and actuated by said output signal.

2. In a system for vertical landing aircraft the combination comprising a comparator, means for supplying to said comparator a signal proportional to the square of the vertical velocity, means for supplying to said comparator a signal indicative of the product of altitude and maximum possible vertical acceleration and alarm means connected to be actuated by said comparator when the first mentioned signal has a magnitude greater than the last mentioned signal.

3. The system according to claim 2, wherein said means for supplying a signal proportional to the square of the velocity comprises a vertical speed indicator and a squaring generator connected to receive a signal from said vertical speed indicator and to deliver a signal to said comparator proportional to the square of the signal received from said vertical speed indicator.

4. The system according to claim 2, wherein said means for supplying the last mentioned signal to said comparator includes a multiplier having its output connected to said comparator, and an altimeter having its output connected to said multiplier, and a vertical accelerometer having its output connected to said multiplier.

No references cited.